(12) United States Patent
Cormier et al.

(10) Patent No.: US 9,872,276 B2
(45) Date of Patent: Jan. 16, 2018

(54) SCHEDULING OF SOFTWARE PACKAGE TRANSMISSIONS ON A MULTIMEDIA BROADCAST MULTICAST SERVICE CHANNEL

(71) Applicant: Google Inc., Mountain View, CA (US)

(72) Inventors: Jean-Philippe Cormier, London (GB); Guillaume Desjardins, London (GB)

(73) Assignee: Google LLC, Mountain View, CA (US)

( * ) Notice: Subject to any disclaimer, the term of this patent is extended or adjusted under 35 U.S.C. 154(b) by 206 days.

(21) Appl. No.: 14/594,562

(22) Filed: Jan. 12, 2015

(65) Prior Publication Data
US 2016/0205662 A1    Jul. 14, 2016

(51) Int. Cl.
*H04W 72/00* (2009.01)
*H04W 72/04* (2009.01)
*H04W 72/12* (2009.01)
*H04L 12/18* (2006.01)
*H04W 8/24* (2009.01)
*H04M 1/725* (2006.01)

(52) U.S. Cl.
CPC ......... *H04W 72/005* (2013.01); *H04L 12/189* (2013.01); *H04M 1/72525* (2013.01); *H04W 8/245* (2013.01)

(58) Field of Classification Search
None
See application file for complete search history.

(56) References Cited

U.S. PATENT DOCUMENTS

| | | | | | |
|---|---|---|---|---|---|
| 4,256,925 | A | * | 3/1981 | Goode | H04B 7/2123 370/322 |
| 5,768,539 | A | * | 6/1998 | Metz | G06F 8/60 348/E5.006 |
| 5,826,166 | A | * | 10/1998 | Brooks | H04N 7/17318 348/E5.005 |

(Continued)

OTHER PUBLICATIONS

3GPP, 3rd Generation Partnership Project; Technical Specification Group Services and System Aspects; Multimedia Broadcast/Multicast Service (MBMS) user services; Stage 1 (Release 12); 3GPP TS 22.246 V12.0.0 (Oct. 2014), Oct. 2014, 17 pages.

(Continued)

*Primary Examiner* — Mark Rinehart
*Assistant Examiner* — Sanjay K Dewan
(74) *Attorney, Agent, or Firm* — McDonnell Boehnen Hulbert & Berghoff LLP (57) ABSTRACT

A computing device may schedule transmission of software packages on a broadcast/multicast downlink channel. The schedule may also include media transmissions on the channel, and the software package transmissions may be scheduled for times when the media transmissions are using less than or equal to a threshold capacity level of the channel. A software update request may be received from a wireless computing device. Possibly in response to receiving the software update request, a particular software package related to the wireless computing device may be determined. The particular software package may be scheduled to begin transmission on the channel at a particular time. At least an identifier of the channel and the particular time may be transmitted to the wireless computing device.

20 Claims, 6 Drawing Sheets

(56) References Cited

U.S. PATENT DOCUMENTS

| | | | |
|---|---|---|---|
| 7,408,931 B2 | 8/2008 | Logalbo et al. | |
| 7,796,631 B2* | 9/2010 | Sinnarajah | H04W 4/06 370/389 |
| 7,948,913 B1* | 5/2011 | Dinan | H04L 1/0019 370/252 |
| 7,974,613 B1* | 7/2011 | Shanker | G06F 8/68 455/418 |
| 8,190,092 B1* | 5/2012 | Lee | H04L 1/0003 370/342 |
| 8,893,110 B2* | 11/2014 | Kapadekar | G06F 8/65 717/171 |
| 9,008,152 B2* | 4/2015 | Garikipati | H04B 7/0417 370/312 |
| 9,030,988 B2* | 5/2015 | Sayeed | H04W 72/005 370/312 |
| 9,143,206 B2* | 9/2015 | Zhang | H04B 7/0874 |
| 9,277,372 B2* | 3/2016 | Lohmar | H04W 72/005 |
| 9,537,668 B2* | 1/2017 | Bao | H04L 12/1886 |
| 2002/0111134 A1* | 8/2002 | Salurso | H04N 21/26216 455/3.06 |
| 2004/0132448 A1* | 7/2004 | Torres | H04B 7/18595 455/427 |
| 2005/0272455 A1 | 12/2005 | Oommen | |
| 2007/0130362 A1 | 6/2007 | Oommen et al. | |
| 2007/0220573 A1 | 9/2007 | Chiussi et al. | |
| 2008/0025239 A1* | 1/2008 | Bossoli | G06F 8/60 370/312 |
| 2008/0108321 A1 | 5/2008 | Taaghol et al. | |
| 2008/0113662 A1* | 5/2008 | Kuo | H04W 36/22 455/418 |
| 2008/0212509 A1* | 9/2008 | Kim | H04W 72/005 370/312 |
| 2009/0046816 A1* | 2/2009 | Hong | H04L 1/0045 375/340 |
| 2011/0090836 A1* | 4/2011 | Mochizuki | H04W 36/18 370/312 |
| 2011/0243056 A1* | 10/2011 | Jen | H04L 5/0007 370/312 |
| 2011/0314462 A1* | 12/2011 | Clark | G06F 8/65 717/169 |
| 2012/0072901 A1 | 3/2012 | Hessenauer et al. | |
| 2012/0076064 A1* | 3/2012 | Ma | H04W 72/005 370/312 |
| 2013/0136049 A1 | 5/2013 | Song et al. | |
| 2014/0173588 A1* | 6/2014 | Ko | G06F 8/68 717/173 |
| 2014/0198677 A1* | 7/2014 | Xu | H04L 1/0026 370/252 |
| 2015/0282199 A1* | 10/2015 | Du | H04W 72/10 370/312 |
| 2016/0205662 A1* | 7/2016 | Cormier | H04W 72/005 370/312 |

OTHER PUBLICATIONS

ETSI, Universal Mobile Telecommunications System (UMTS); LTE; Multimedia Broadcast/Multicast Service (MBMS); Protocols and codecs (3GPP TS 26.346 version 12.3.0 Release 12); ETSI TS 126 346 V12.3.0 (Oct. 2014), Oct. 2014, 204 pages.

OMA (Open Mobile Alliance), Firmware Update Management Object Approved Version 1.0.2, Aug. 28, 2009, 31 pages.

OMA (Open Mobile Alliance), OMA Device Management Protocol Candidate Version 2.0, Dec. 10, 2013, 104 pages.

Paila et al., "FLUTE—File Delivery over Unidirectional Transport," Internet Engineering Task Force (IETF), Standards Track, ISSN: 2070-1721, Nov. 2012, 46 pages.

* cited by examiner

SCHEDULING OF SOFTWARE PACKAGE TRANSMISSIONS ON A MULTIMEDIA BROADCAST MULTICAST SERVICE CHANNEL

BACKGROUND

Multimedia broadcast multicast service (MBMS) channels may be used in networks to distribute content to wireless computing devices (WCDs). This content may include multimedia, such as streaming audio and/or video. By transmitting the content on an MBMS channel, one transmission can potentially be received by a large number of WCDs. As a result, less network capacity may be used in comparison to unicasting the transmission to each of the WCDs separately.

SUMMARY

Since MBMS channels support packet-switched communication, these channels can be used for transporting any sort of digital content from a source device to one or more destination devices. Consequently, in some cases, it may be advantageous to distribute software updates, and/or related types of files, to wireless computing devices using MBMS. Particularly, a specific software package (e.g., a software update) for a specific operating system and/or device type may be scheduled for transmission on an MBMS channel when that channel would otherwise be idle. Alternatively or additionally, the software package transmission may be scheduled for when some, but not all, of the capacity of the MBMS channel is in use. These software packages may include new versions of a wireless computing device operating system, library, application, and/or a data file.

Accordingly, in a first example embodiment, a computing device may schedule transmission of software packages on a broadcast/multicast downlink channel. The schedule may also include media transmissions on the broadcast/multicast downlink channel, and the software package transmissions may be scheduled for times when the media transmissions are using less than or equal to a threshold capacity level of the broadcast/multicast downlink channel. A software update request may be received from a wireless computing device. In some embodiments this could be a device information exchange message. Possibly in response to receiving the software update request, a particular software package related to the wireless computing device may be determined. The particular software package may be scheduled to begin transmission on the broadcast/multicast downlink channel at a particular time. At least an identifier of the broadcast/multicast downlink channel and the particular time may be transmitted to the wireless computing device.

In a second example embodiment, an article of manufacture may include a non-transitory computer-readable medium, having stored thereon program instructions that, upon execution by a computing device, cause the computing device to perform operations in accordance with the first example embodiment.

In a third example embodiment, a computing device may include at least one processor, data storage, and program instructions. The program instructions may be stored in the data storage, and upon execution by the at least one processor may cause the computing device to perform operations in accordance with the first example embodiment.

In a fourth example embodiment, a system may include means for scheduling transmission of software packages on a broadcast/multicast downlink channel, where the schedule also includes media transmissions on the broadcast/multicast downlink channel, and where the software package transmissions are scheduled for times when the media transmissions are using less than or equal to a threshold capacity level of the broadcast/multicast downlink channel. The system may also include means for receiving a software update request from a wireless computing device. The software update request may take the form of a device information exchange message, and this message can also include the indication that the wireless computing device supports MBMS for over-the-air (OTA) updates, and may indicate what version of software is currently installed on the device. The system may further include means for, in response to receiving the software update request, determining a particular software package related to the wireless computing device, where the particular software package is scheduled to begin transmission on the broadcast/multicast downlink channel at a particular time. The system may additionally include means for transmitting, to the wireless computing device, at least an identifier of the broadcast/multicast downlink channel, and the particular time.

These as well as other embodiments, aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Example methods, devices, and systems are described herein. Herein, the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the described example embodiments are not intended to be limiting. Aspects of the present disclosure, as generally described herein and illustrated in the figures, can be arranged, substituted, combined, separated, and designed in a wide variety of different configurations, all of which are explicitly contemplated herein.

1. OVERVIEW

Multimedia broadcast multicast service (MBMS) is a point-to-multipoint packet-data service in which content is transmitted from a single source to one or more destinations. While MBMS channels can be deployed in cellular networks, using cellular wireless spectrum, other types of wireless networks can potentially support MBMS as well. As used herein, the term "MBMS" shall encompass any type of MBMS deployment, such as MBMS over Long Term Evolution (LTE®) networks, which is sometimes called "eMBMS." MBMS is used in this description as one embodiment, but other broadcast services can be used as well.

MBMS can support at least two delivery modes, streaming media and file downloads. As an example, the streaming media service may be used for transmission of live audio or audio/video from sporting events and music concerts. Additionally, the streaming service can support non-real-time transmission of audio or audio/video, such as on-demand television, streaming music, podcasts, and so on. On the other hand, the download service may support delivery of news, weather, and other types of information, as well as software packages and related files.

Both modes may involve various aspects of security, key distribution, and forward error correction techniques, for example. In some cases, an MBMS transaction may involve using a non-MBMS channel (e.g., a unicast channel) for some aspects of the transaction, such as requesting particular content, acknowledging such a request, and/or verifying delivery of a download. For the purposes described herein, any sort of signaling mechanism, in-band or out-of-band, may be used for these purposes. For instance, the Real Time Streaming Protocol (RSTP), the Session Description Protocol (SDP), and the File Delivery over Unidirectional Transport (FLUTE) protocol may be used alone or in combination to facilitate MBMS transactions.

As noted above, MBMS may be used for transmission of both multimedia content and non-multimedia content. As such, it is expected that the multimedia content may require significantly more MBMS channel capacity than the non-multimedia content. For example, streaming a high-definition, two or three hour long movie to wireless computing devices may require as much as 25 gigabytes of MBMS channel capacity. In contrast, an operating system update may require less than 1 gigabyte of MBMS channel capacity, and application updates may require only a few tens of megabytes of MBMS channel capacity.

Given these factors, it may be desirable to schedule downloads in between multimedia transmissions, or when the multimedia transmissions are not using the entire capacity of the MBMS channel. As one example, MBMS channels may be used to stream live football games to wireless computing devices. But, since football games, as well as other sporting events, typically take place during the day or the evening, the MBMS channels may have unused capacity overnight. Thus, downloads can be scheduled for WCDs during these overnight hours.

This overnight scheduling may be convenient for users who typically do not use their wireless computing devices during overnight hours. When these users check their devices in the morning, they may be pleased to find that one or more updates have been downloaded and are ready for installing, or have been automatically installed.

As another example, many video transmissions are variable-bit-rate. The amount of capacity that the video transmission uses at any particular point in time may be based on the complexity of the scene. A scene with a significant amount of movement or action may require a higher bitrate (more capacity) than a relatively static scene. Therefore, some downloads may be scheduled to occur on the same MBMS channel as a variable-bit-rate video transmission, when the video transmission is using less than a threshold amount of the MBMS channel's capacity.

An additional advantage to scheduling downloads via an MBMS channel is that wireless computing devices may use less power to receive these downloads from the MBMS channel than a unicast channel. Since MBMS channels are unidirectional downlink channels, wireless computing devices only receive on these channels. Receiving typically uses less power than transmitting. As a result, receiving downloads via an MBMS channel may use less power, and therefore less battery capacity, than unicast transmissions where the wireless computing device is periodically transmitting acknowledgements to a unicast sender.

A further advantage to scheduling downloads via an MBMS channel is that it allows wireless service providers and application providers to push important and critical software updates to wireless computing devices in a rapid fashion. For example, normal-priority software updates may be scheduled for distribution to wireless computing devices over the course of a one or two week period, in order to spread out the load on servers supporting these downloads. Even if wireless computing devices are configured to check the availability of new software updates every few hours or once a day, these software updates may not be visible to a particular wireless computing device until that device's scheduled download time.

But when MBMS is used, one transmission from a download server can potentially reach thousands, or even hundreds of thousands, of wireless computing devices. Thus, these devices can all be informed of a scheduled time for the download, and may receive the download at that time. Therefore, a large percentage (e.g., 90% or more) of these WCDs may be able to receive and install a critical software update in less than 24 hours.

The embodiments herein provide implementations of scheduling and providing MBMS-based software package transmissions to wireless computing devices. The next section describes illustrative examples of such computing devices and systems.

2. EXAMPLE COMMUNICATION SYSTEM

Figure 1:
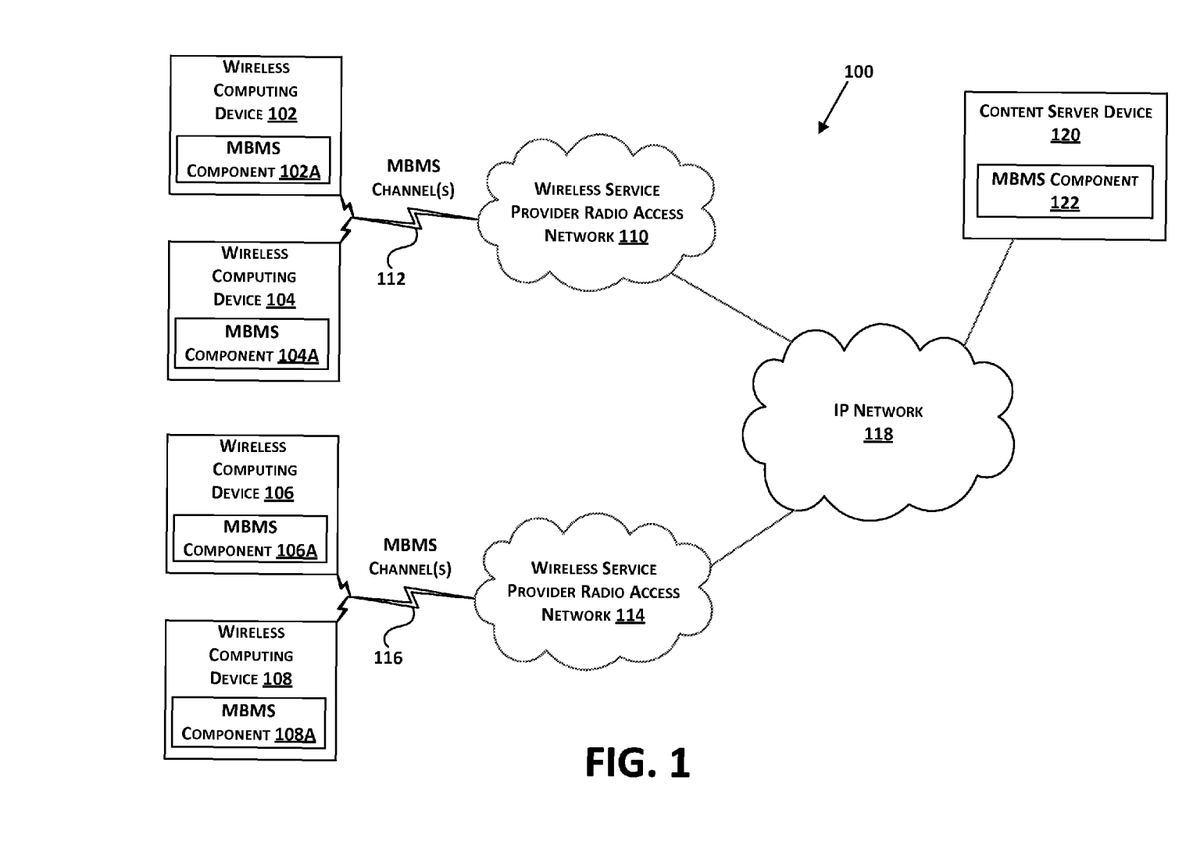
FIG. 1 depicts an MBMS networked environment, according to example embodiments.

FIG. 1 illustrates an example communication system 100 for carrying out one or more of the embodiments described herein. Communication system 100 may include computing devices for carrying out one or more operations or procedures. Herein, a "computing device" may refer to either a client device (e.g., a wireless computing device), a server device (e.g., a networked cluster of server equipment), or some other type of computational platform.

Wireless computing devices 102, 104, 106, 108 may be any type of device capable of wireless communication, including laptop computers, wearable computing devices, head-mountable computing devices, mobile telephones, radios, televisions, or tablet computing devices, etc. In FIG. 1, wireless computing devices 102, 104, 106, 108 may communicate with content server device 120 via wireless service provider radio access network 110 and IP network 118, or via wireless service provider radio access network 114 and IP network 118.

Each of wireless computing devices 102, 104, 106, 108 may include a user interface, a communication interface, a processor, and data storage (e.g., memory). The data storage may contain instructions executable by the processor for carrying out one or more operations relating to the data sent to, or received from, content server device 120. The user interface of wireless computing devices 102, 104, 106, 108 may include buttons, a touchscreen, a microphone, and/or any other elements for receiving inputs, as well as a speaker, one or more displays, and/or any other elements for communicating outputs. Wireless computing devices 102, 104, 106, 108 may contain MBMS components 102A, 104A, 106A, and 108A, respectively. Each of these MBMS components may be a software or hardware module configured to receive media and/or download content from content server device 120, and/or other MBMS enabled content server devices, as well as to communicate in other ways with content server devices.

Wireless service provider radio access networks 110, 114 may operate in accordance with Code Division Multiple Access (CDMA), Worldwide Interoperability for Microwave Access (WIMAX®), Universal Mobile Telecommunications System (UMTS), LTE®, or any other wide-area or cellular communication technology. In some cases, these radio access networks may operate in accordance with a local-area communication technology, such as Wifi. As such, wireless service provider radio access networks 110, 114 may include one or more base stations, base station controllers, data access nodes, voice switches, signaling nodes, and user profile databases to support communication with wireless computing devices.

Wireless service provider radio access networks 110, 114 also define one or more MBMS channels, such as MBMS channel 112 and MBMS channel 116, respectively. Each MBMS channel may support multicasting and/or broadcasting one or more simultaneous transmissions via a radio access network to wireless computing devices. Although each MBMS channel is shown transmitting to two wireless computing devices, anywhere from one to thousands of wireless computing devices may receive each transmission sent on an MBMS channel.

Each of wireless service provider radio access networks 110, 114 may connect to IP network 118. IP network 118, in turn, may be a private IP network or the Internet. Via IP network 118, communications may be exchanged between wireless service provider radio access networks 110, 114 and content server device 120.

Content server device 120 may be any entity or computing device arranged to carry out the operations described herein. Further, content server device 120 may be configured to send and/or receive data from wireless computing devices 102, 104, 106, 108. Content server device 120 may include an MBMS component 122, which may be configured to schedule MBMS transmissions, process MBMS requests received from wireless computing devices 102, 104, 106, 108, and carry out MBMS transmissions to these wireless computing devices. MBMS component 122 may be software and/or hardware configured for these purposes. Further, content server device 120 may be configured to provide an MBMS transmission to wireless computing devices 102, 104 via wireless service provider radio access network 110, and to wireless computing devices 106, 108 via wireless service provider radio access network 114.

In some cases, content server device 120 may include or have access to a database of content (not shown), such as audio content, audio/video content, and/or software packages that can be transmitted via MBMS procedures. Other content and/or data may also be stored or accessible by this database.

FIG. 1 is merely an illustrative embodiment. As such, other types of devices not shown may be present, and more or fewer of any devices may be deployed in various configurations. For instance, more than four wireless computing devices may receive MBMS transmissions, and more than one content server may provide MBMS transmissions via any number of wireless service provider radio access networks. Further, these content server devices may reside within a wireless service provider radio access network, and may be partially or wholly controlled by the wireless service provider.

Figure 2:
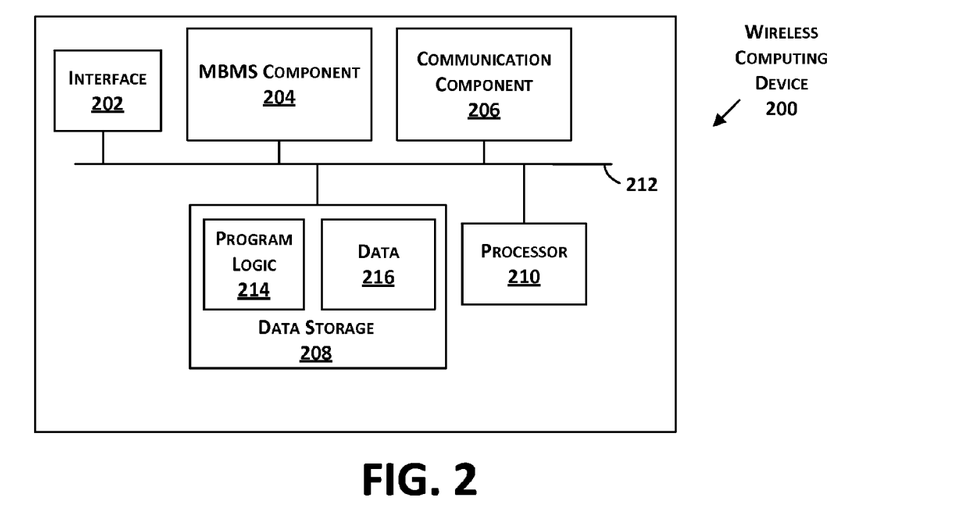
FIG. 2 illustrates a schematic drawing of a wireless computing device, according to example embodiments.

FIG. 2 illustrates a schematic drawing of an example wireless computing device 200, where wireless computing device 200 is an example embodiment of one of wireless computing devices 102, 104, 106, 108. Thus, wireless computing device 200 may, for example, take the form of any wireless computing devices described above in relation to FIG. 1. In some examples, components illustrated in FIG. 2 may be distributed across multiple wireless computing devices. Nonetheless, for illustrative purposes, components are shown and described in FIG. 2 as part of an example wireless computing device 200.

In some implementations, wireless computing device 200 may include a device platform or operating system (not shown). The device platform may include different applications and an application framework, as well as various kernels, schedulers, memory managers, libraries, and runtime entities. In other examples, other modules or subsystems may operate on wireless computing device 200 as well.

Wireless computing device 200 may include an interface 202, an MBMS component 204, a communication component 206, data storage 208, and a processor 210. Components illustrated in FIG. 2 may be linked together by a communication bus 212. Wireless computing device 200 may also include additional hardware to enable further functionality and/or operations.

Interface 202 may be configured to allow a user to interact with wireless computing device 200. Thus, interface 202 may include user-interface components, such as a keyboard, microphone, touchscreen, touchpad, display, speaker, etc.

MBMS component 204 may be software and or hardware configured to carry out any MBMS operations described herein. Thus, for instance, MBMS component 204 may be able to request particular media or download content from a content server device, receive an indication of the MBMS channel that will provide this content, instruct communication component 206 to tune to this channel, and then receive and process this MBMS content. Other examples are also possible.

Communication component 206 may be a communication interface that is configured to facilitate wireless data and/or voice communication according to one or more wide-area wireless communication standards or non-standard protocols. For example, communication component 206 may be configured to facilitate wireless data communication according to CDMA, WIMAX, UMTS, LTE, or other protocols now known or later developed. Local-area wireless communication standards, such as Wifi, may be supported as well.

Data storage 208 may store program logic 214 that can be accessed and executed by processor 210. Program logic 214 may include machine-readable instructions that, when executed by processor 210, cause wireless computing device 200 to carry out various operations and procedures. To the extent that MBMS component 204 is software, this software may be part of program logic 214.

Data storage 208 may also store data 216 that may include data received via MBMS procedures, such as media and/or download data. Data storage 208 may store additional data as well. Data storage 208 may be a non-transitory computer-readable data medium, such as a hardware memory module.

Processor 210 may be any type of one or more microprocessors or general-purpose processors. However, processor 210 may be integrated with or include various types of co-processors, network processors, graphics processors, and/or digital logic.

Communication bus 212 is illustrated as a wired connection; however, wireless connections may also be used. For example, communication bus 212 may be a wired serial bus such as a universal serial bus or a parallel bus, or a wireless connection using, e.g., short-range wireless radio technology, communication protocols described in IEEE 802.11 (including any IEEE 802.11 revisions), or cellular technology, among other possibilities.

Figure 3:
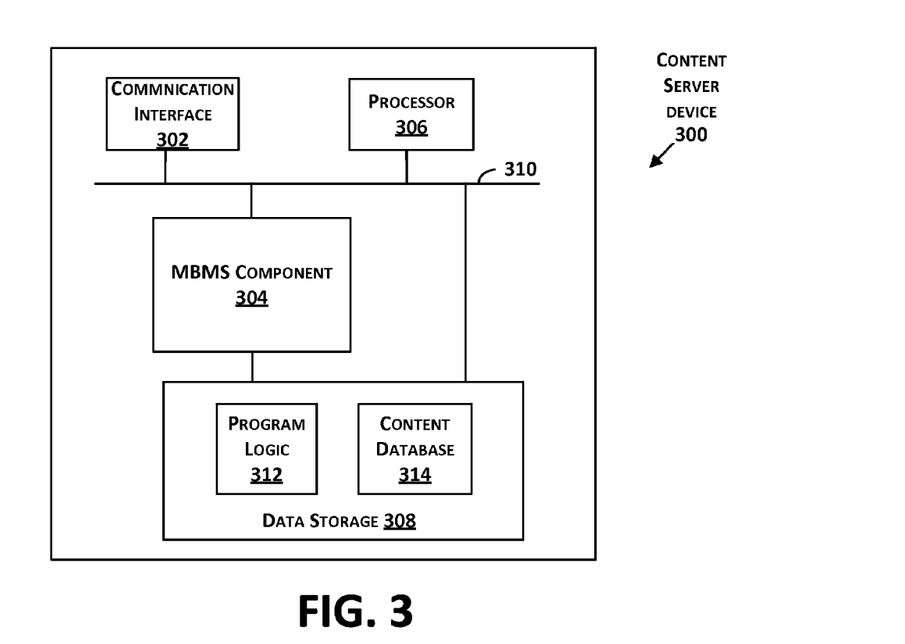
FIG. 3 illustrates a schematic drawing of a content server device, according to example embodiments.

FIG. 3 illustrates a schematic drawing of another example computing device, content server device 300. In examples, some components illustrated in FIG. 3 may be distributed across multiple physical content server devices. However, for the sake of illustration and simplicity, the components are shown and described as part of one example content server device 300. Content server device 300 may be a computing device, cloud-based server, or similar entity that may be configured to perform the operations described herein. For instance, content server device 300 may be an embodiment of content server device 120.

Content server device 300 may include a communication interface 302, an MBMS component 304, a processor 306, and data storage 308. All of the elements illustrated in FIG. 3 may be linked together by a communication bus 310 (e.g., a wired or wireless link).

Communication interface 302 may allow content server device 300 to communicate with other devices, such as wireless computing devices described above in relation to FIG. 2. Thus, communication interface 302 may be configured to receive input data from one or more computing devices, and may also be configured to send output data to the one or more computing devices (e.g., wireless computing devices or other types of devices).

MBMS component 304 may be software and or hardware configured to carry out any MBMS operations described herein. Thus, for instance, MBMS component 304 may be able to receive requests for particular media or download content from wireless computing devices, transmit an indication of the MBMS channel over which this content will be transmitted, and then transmit this MBMS content over the indicated MBMS channel. In some cases, the MBMS content may be retrieved from content database 314 prior to transmission. Other examples are also possible.

Data storage 308 may store program logic 312 that can be accessed and executed by processor 306. To the extent that MBMS component 304 is software, this software may be part of program logic 312.

Data storage 308 may also include content database 314 that can be accessed by processor 306 as well, for example, to retrieve media and/or download content. The content in content database 314 may include stored audio content, stored audio/video content, references to live audio content feeds (e.g., live radio), references to live audio/video content feeds (e.g., live television), and/or software packages. The references may be uniform resource locators, or other types of identifiers, of the live feeds. These live feeds may stream through content server device 300.

Like data storage 212, data storage 308 may be a non-transitory computer-readable data medium, such as a hardware memory module. Also, like processor 210, processor 306 may be any type of one or more microprocessors or general-purpose processors, and may be integrated with or include various types of co-processors, network processors, graphics processors, and/or digital logic.

3. EXAMPLE MBMS SCHEDULING

Figure 4:
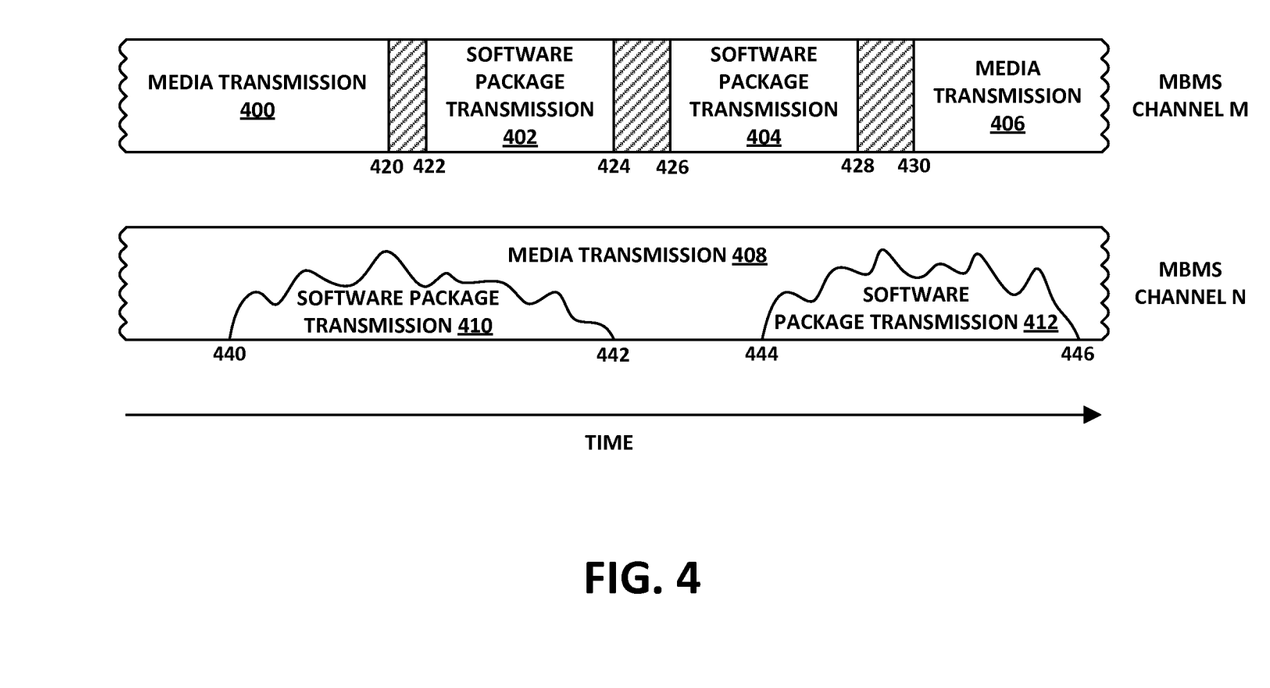
FIG. 4 is a depiction of transmission schedules, according to example embodiments.

FIG. 4 is a depiction of transmission schedules, according to example embodiments. In FIG. 4, partial schedules are shown for two MBMS channels, MBMS channel M and MBMS channel N. In an actual MBMS system, however, more or fewer MBMS channels may be used.

For MBMS channel M, two media transmissions are scheduled. Media transmission 400 ends at time 420, and media transmission 406 begins at time 430. In between time 420 and time 430, MBMS channel M might initially be idle. Consequently, software package transmission 402 is scheduled to begin at time 422 and end at time 424, and software package transmission 404 is scheduled to begin at time 426 and end at time 428. These software package transmissions may have been scheduled for times when MBMS channel M is idle so that the software package transmissions do not interfere with the media transmissions. Idle time periods of MBMS channel M are represented by cross-hatching.

For MBMS channel N, one media transmission is scheduled. Media transmission 408 begins before the time period illustrated in FIG. 4, and ends after this time period. However, from time 440 to time 442, and from time 444 to time 446, there may be spare capacity on MBMS channel N. As an example, these time periods (from time 440 to time 442, and from time 444 to time 446) may represent epochs in which the media transmission may use less than a threshold amount of the capacity of MBMS channel N. This threshold amount may be 10%, 20%, 50%, or some other relative or absolute measure of channel capacity. Any spare capacity of MBMS channel N is not shown in FIG. 4.

Consequently, software package transmission 410 may be scheduled to begin transmission at time 440, and end transmission at time 442. Software package transmission 412 may be scheduled to begin transmission at time 444, and end transmission at time 446.

The size of each software package (e.g., as measured in kilobytes, megabytes, or gigabytes—the sizes may vary based on the complexity of the software package and the extent of forward error correction used in the MBMS transmission of the software package) and the data rate and/or spare capacity of each MBMS channel may be taken into account when scheduling software package transmissions. For instance, based on the data rate and spare capacity of an MBMS channel, a particular software package may be scheduled for transmission during a time period in which it can be completely transmitted without exceeding the capacity limits of the MBMS channel.

Figure 5A:
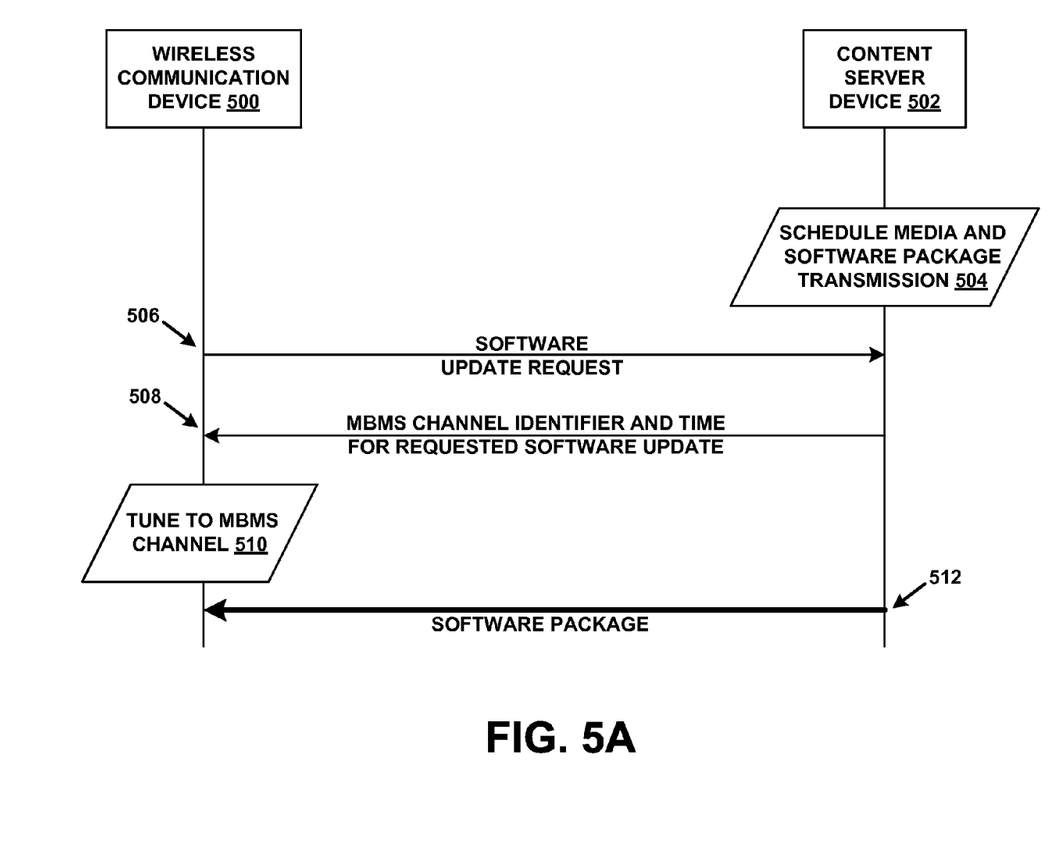
FIG. 5A is a message flow diagram, according to example embodiments.

FIG. 5 is a message flow diagram depicting an example MBMS transaction between wireless computing device 500 and content server device 502. Wireless computing device 500 may be any type of device configured to receive MBMS transmissions, such as example wireless computing device 200. Content server device 502 may be any device configured to provide MBMS transmissions, such as example content server device 300.

In FIG. 5, communication on a unicast (point-to-point) channel is depicted with a thin line (see steps 506 and 508) and communication on an MBMS channel is depicted with a thicker line (see step 512).

At step 504, content server device 502 may schedule media and software package transmissions on one or more MBMS channels. Alternatively, content server device 502 may schedule media and software package transmissions, and other devices (such as radio access network devices) may determine which MBMS channels these transmissions will use.

At step 506, wireless computing device 500 may transmit a software update request to content server device 504. Wireless computing device 500 may transmit this request as part of a device information exchange to an Open Mobile Alliance (OMA) device management (DM) server, a Firmware Update Management Object (FUMO) server, or a firmware over-the-air (FOTA) server.

This software update request may seek to determine whether there are any software packages used by wireless computing device 500 that should be updated. These software packages may include operating system packages, library packages, application packages, and/or data files. Alternatively, the software update request may seek to determine whether a particular software package should be updated.

As an example, an application developer may release new versions of a particular application to one or more application stores. These application stores may be portals through which applications can be purchased and/or downloaded. In order to be able to download these new versions in a timely fashion, a wireless computing device may periodically, or from time to time, query the application store. The application store may, in turn, notify the wireless computing device of which (if any) software packages have been updated. Then, the wireless computing device can download the updated software package(s).

Content server device 502 may take on some or all operations of such an application store, and may incorporate MBMS operations as well. For instance, rather than having the application store transmit, via unicast, hundreds or thousands of copies of an updated software package to wireless computing devices individually, content server device 502 may schedule a limited number of MBMS transmissions of the software package, and inform wireless computing devices of these MBMS transmissions. The wireless computing devices may then have an option to either (i) immediately download the software update via unicast, or (ii) wait for one of the scheduled MBMS transmissions.

The user of a wireless computing device may be incentivized to wait for the MBMS transmission. For instance, the wireless service provider to which the user subscribes might not charge for receiving MBMS transmissions, and/or might not count such receptions toward the user's data usage. Further, as noted above, the user might be informed that receiving MBMS transmissions may use less power than unicast transmissions. Therefore, if the user is concerned about conserving his or her battery life, the user might be motivated to wait for an MBMS transmission.

Regardless, at step 508, content server device 502 may transmit an MBMS channel identifier and an indication of a time at which the software package transmission is scheduled. The identifier may include the IP address of an MBMS server (e.g., content server device 502) and a transport session identifier (TSI) of the software package transmission. The TSI may be a bit string or code that uniquely identifies the transmission, per IP address. For instance, each IP address/TSI pair may uniquely identify an MBMS transmission before, during, and/or after the time that transmission is active.

Alternatively or additionally, the identifier may include one or more transport object identifiers (TOIs). A TOI may be used to uniquely identify an object (e.g., a file or a message) within an MBMS transmission. Thus, a specific object can be uniquely identified by the combination of MBMS server IP address, TSI, and TOI. In some embodiments, an OMA DM server can include the TSI and/or the TOI along with a uniform resource locator (URL) in the download node of an OMA management object. Optionally, the identifier may indicate to the wireless computing device what radio technology to use when receiving the particular software package. Such a radio technology may include MBMS (broadcast), LTE®, Wifi, and other types of local-area or wide-area radio technologies.

In some cases, the MBMS channel identifier may also identify the frequency of the identified MBMS channel. To that point, at step 510, wireless computing device 500 may tune to the identified MBMS channel, so that wireless computing device 500 can receive MBMS transmissions on this channel. Wireless computing device 500 may perform this tuning procedure prior to the time at which the software package transmission is scheduled.

It is possible that content server device 502 performs step 508 without being triggered to do so by wireless computing device 500. For instance, content server device 502 may be aware of the software packages installed on wireless computing device 500, and may transmit an indication to wireless computing device 500 when one or more of these software packages have been updated and/or are scheduled for MBMS download. This indication can be triggered by a Push Initiation message, which may be sent from an OMA DM server.

At step 512, which takes place at this time, content server device 502 may transmit the software package on the identified MBMS channel. This transmission may be one of potentially many made by content server device 502 and/or other devices, on the identified MBMS channel and/or other MBMS channels.

In some embodiments, transmission of the software package to the wireless computing device may occur from an OMA DM server. Alternatively, some of the MBMS transaction may occur between the wireless computing device and an OMA DM server, while the transmission of the software package may be performed by a separate content server device.

The separate content server device can make use of MBMS to transmit the software package to the wireless computing device. When the OMA DM server device determines that it is to carry out a software update with the wireless computing device, it can communicate this intent to the content server device by indicating the urgency, the size, and the package that is to be transmitted. The content server device can determine when the package can be transmitted using MBMS, and respond with the associated transmission schedule to the OMA DM server device. If the content server device has no MBMS resources to meet the requirements indicated by the OMA DM server device, the content server device can respond with a negative acknowledgment to the OMA DM server device. This may allow the OMA DM server device to find an alternative download mechanism.

Figure 5B:
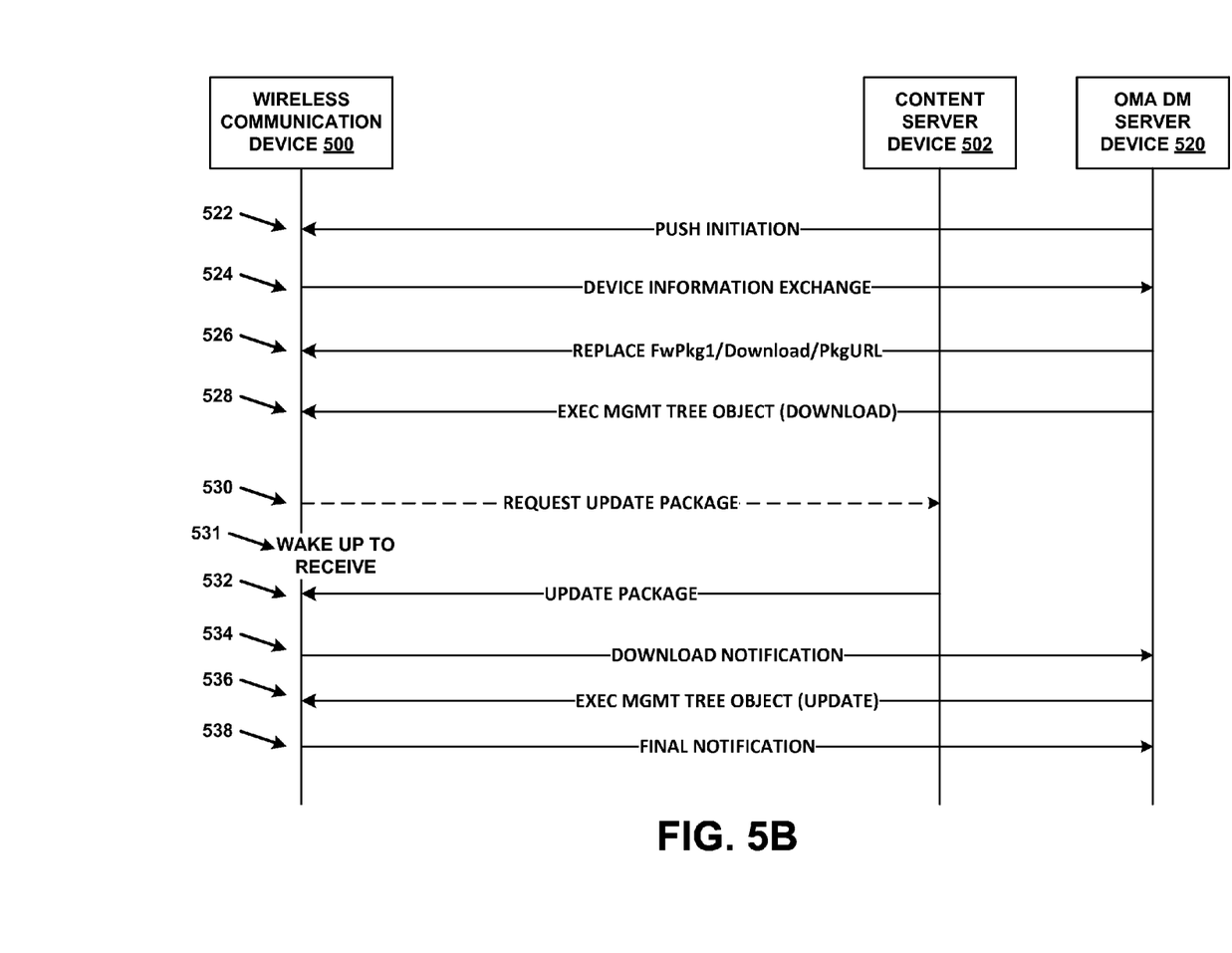
FIG. 5B is another message flow diagram, according to example embodiments.

FIG. 5B is a flow chart that illustrates these embodiments. At step 522, OMA DM server device 520 may transmit a push initiation message to wireless computing device 500. An OMA DM server may be arranged to deliver configuration parameters to an OMA DM client, such as wireless computing device 500, by using a set of commands for various management procedures. These commands may be executed by the OMA DM client. The OMA DM client, in turn, exposes some of its internal data to the OMA DM server in the form of a hierarchy known as a DM tree. Regardless, the push initiation message may open communication between wireless computing device 500 and OMA DM server device 520. In some cases, the push initiation may be transmitted by wireless computing device 500.

At step 524, device information exchange may occur. In this step, wireless computing device 500 may provide at least a minimum set of selection criteria so that OMA DM server device 520 can determine an appropriate software package for wireless computing device 500.

At step 526, OMA DM server device 520 may transmit a replace command to wireless computing device 500. The argument of this command, FwPkg1/Download/PkgURL, indicates which software package is to be replaced. Thus, the example in FIG. 5B is merely for purposes of illustration, and different arguments can take on different values based on the software package being replaced. In some embodiments, this command may contain the transmission schedule, TOI, TSI and/or URL of the software package.

At step 528, OMA DM server device 520 may transmit an exec command to wireless computing device 500. This command instructs wireless computing device 500 to download the new version of the software package from content server device 502. (In some embodiments, a user may be prompted to approve this download before the download takes place.) Additionally, this command may contain the transmission schedule, TOI, TSI and/or URL of the package. Upon reception of the exec command, wireless computing device 500 can use the transmission schedule to determine when to wake up in order to receive the software package. Optionally, the exec command may indicate to the wireless computing device what radio technology to use when receiving the particular software package. Such a radio technology may include MBMS (broadcast), LTE®, Wifi, and other types of local-area or wide-area radio technologies.

Step 530, shown with a dashed line, illustrates an alternative embodiment. Wireless computing device 500 may request the software package from content server device 502, and content server device 502 may transmit the requested software package to wireless computing device 500. Wireless computing device 500 may then perform the installation of the software package, again with optional approval from the user.

Upon determining that the software package will be transmitted using the transmission schedule, wireless computing device 500 may ignore step 530. Instead, wireless computing device 500 may wake up at step 531 to receive the software package transmitted by the content server device using MBMS at step 532. During reception, wireless computing device 500 can check if the parameters package transmitted at the transmission schedule time match the TOI, TSI and/or URL indicated by the OMA DM server device.

Regardless of how wireless computing device 500 obtains the software package, at step 534, wireless computing device 500 may transmit a download notification to OMA DM server device 520. The download notification may serve to inform OMA DM server device 520 of whether the software update download and/or installation succeeded.

At step 536, OMA DM server device 520 may transmit another exec command to wireless computing device 500. This exec command may instruct wireless computing device 500 to update its DM tree. In particular, the exec command may instruct wireless computing device 500 to execute an update of the existing version of the software package with the downloaded version. (In some embodiments, a user may be prompted to approve this replacement before it the replacement takes place.) Then, at step 538, the MBMS transaction completes when wireless computing device 500 transmits a final notification to OMA DM server device 520.

4. EXAMPLE OPERATIONS

Figure 6:
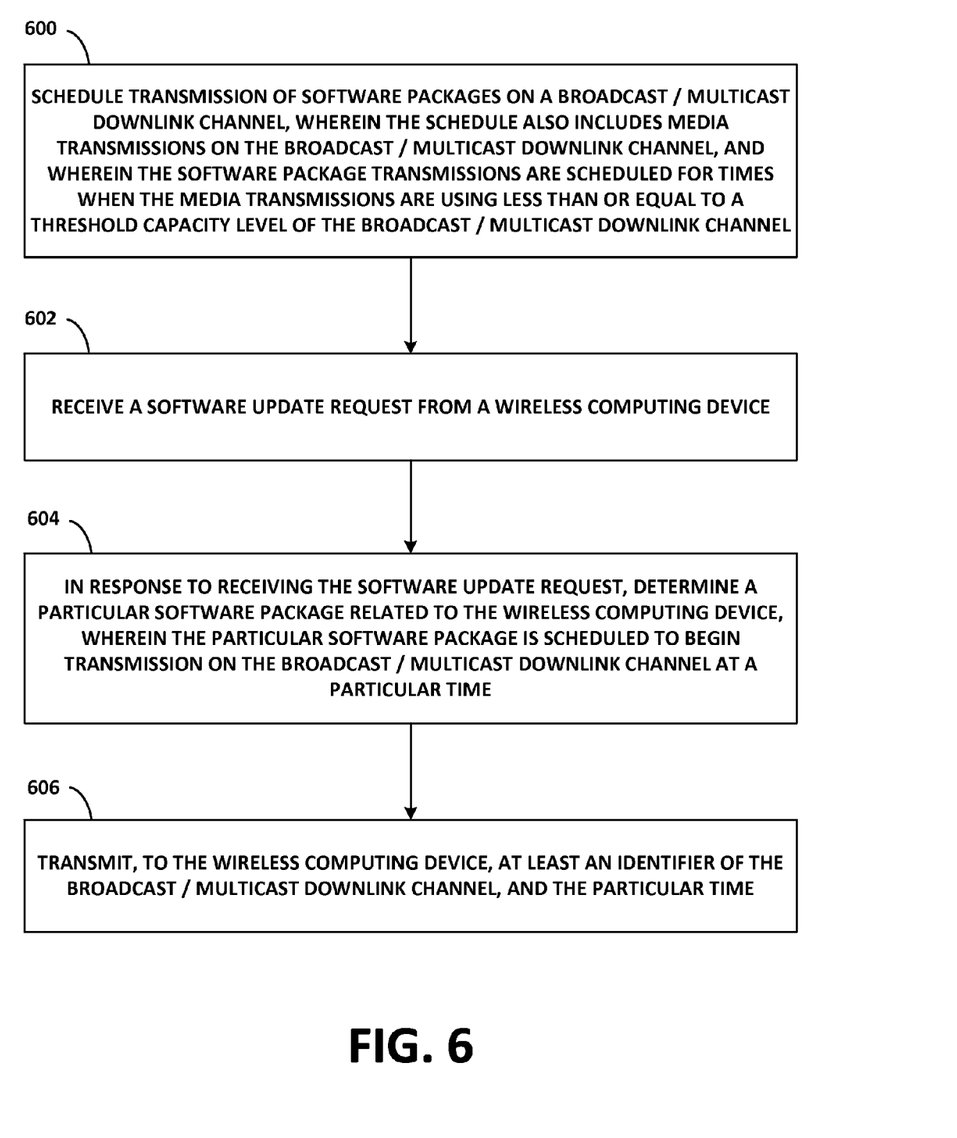
FIG. 6 is a flow chart, according to example embodiments.

FIG. 6 is a flow chart illustrating an example embodiment. The procedure illustrated by FIG. 6 may be carried out by a computing device, such as content server device 300, or by some combination of devices. However, the procedure can be carried out by other types of devices or device subsystems. For instance, the computing device that schedules MBMS transmissions may be different from the content server device that carries out these transmissions. Further, the procedure may further incorporate any other aspect or feature disclosed herein.

At block 600, a computing device may schedule transmission of software packages on a broadcast/multicast downlink channel (e.g., an MBMS channel). The broadcast/multicast downlink channel may be a cellular channel. The schedule may also include media transmissions on the broadcast/multicast downlink channel. The software package transmissions may be scheduled for times when the media transmissions are using less than or equal to a threshold capacity level of the broadcast/multicast downlink channel.

At block 602, a software update request or device information exchange message may be received from a wireless computing device. At block 604, possibly in response to receiving the software update request or device information exchange message, a particular software package related to the wireless computing device may be determined. The particular software package may have been scheduled to begin transmission on the broadcast/multicast downlink channel at a particular time. At block 606, at least an identifier of the broadcast/multicast downlink channel, and the particular time, may be transmitted to the wireless computing device. This identifier may include an IP address of a content server device, and a TSI for the transmission of the particular software package. The identifier can also be a URL. In some embodiments, the URL could contain transmission time information and other identifiers including an indication that download using MBMS is preferred for the software package.

In some implementations, the particular software package, and its associated TSI and/or TOI, may be transmitted on the broadcast/multicast downlink channel at the particular time. After such a transmission, it may be determined that the transmission of the particular software package was not properly received by the wireless computing device. Possibly in response, an instruction may be transmitted to the wireless computing device to download the particular software package via a network mechanism other than the broadcast/multicast downlink channel. For instance, a Wifi or cellular unicast channel may be used as a backup in case an MBMS transmission is not properly received by the wireless computing device. The network may indicate to the wireless computing device what radio technology to use when receiving the particular software package. Such a radio technology may include MBMS, LTE®, Wifi, and other types of local-area or wide-area radio technologies.

In some cases, transmission of high-priority software packages may be scheduled before transmission of low-priority software packages on the broadcast/multicast downlink channel. Thus, for instance, transmission of critical software updates may take priority over transmission of non-critical software updates. A critical software update may be pushed to wireless computing devices in order to fix a security flaw, stability problem, or improper functionality of a previously-distributed version of the software package.

As noted above, software package transmissions may be scheduled for times when the media transmissions are using less than or equal to a threshold capacity level of the broadcast/multicast downlink channel. In some cases, this threshold capacity level is zero, indicating that the software package transmissions only occur when the broadcast/multicast downlink channel is not being used for media transmission. On the other hand, when the threshold capacity level is non-zero, the one or more software packages are scheduled for transmission while the particular media transmission is taking place.

In some situations, one or more of the software packages may be related to content of a particular media transmission. For instance, if the media transmission is a football game, the software package may be an application related to one or more of the football league that is a putting on the game, the teams involved in the game, the players involved in the game, and so on. Data to be used with such an application, including advertisements targeted to football fans or to particular markets located near the wireless computing device, may also be transmitted to wireless computing devices in this fashion.

Similarly, if the media transmission is an episode of a television series or a movie, the software package may be an application related to the television series or movie. For instance, the software package may allow users to answer live poll questions, obtain additional information about the television series or movie, and/or play games related to the television series or movie.

Nonetheless, the software packages transmitted during a media transmission need not be related to the media transmission. For instance, various software package transmissions may be scheduled for times when the media transmission is not using the entire extent of its assigned broadcast/multicast downlink channel.

In some embodiments, the schedule may be transmitted to the wireless computing device as part of a device management update, or by using the update or download node of an OMA DM command. In some cases, the schedule can be part of a PkgURL node transmission to the wireless computing device. Regardless, such a device management update may be a mechanism by which a wireless service provider informs wireless computing device users that there are one or more software packages or data file updates available for their wireless computing devices. Signaling or data channels of the wireless service provider's radio access network may be used to provide these device management updates.

In some situations, wireless computing devices may use less power to receive software packages over the broadcast/multicast downlink channel than other types of wireless channels. Thus, the particular software package may be scheduled to be transmitted on the broadcast/multicast downlink channel to reduce power consumption by the wireless computing device.

5. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages can be executed out of order from that shown or discussed, including substantially concurrent or in reverse order, depending on the functionality involved. Further, more or fewer blocks and/or functions can be used with any of the ladder diagrams, scenarios, and flow charts discussed herein, and these ladder diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
   scheduling, by a computing device, transmission of software packages on a broadcast/multicast downlink channel, wherein the schedule also includes media transmissions on the broadcast/multicast downlink channel, wherein the software package transmissions are scheduled for one or more of a plurality of time periods when the media transmissions are using less than or equal to a threshold capacity level of the broadcast/multicast downlink channel, and wherein the threshold capacity level is less than an entire capacity of the broadcast/multicast downlink channel;
   determining a particular software package related to a wireless computing device, wherein the particular software package is scheduled to begin transmission on the broadcast/multicast downlink channel during a particular time period of the plurality of time periods in which the particular software package can be completely transmitted without exceeding the capacity of the channel; and
   transmitting, to the wireless computing device, at least an identifier of the broadcast/multicast downlink channel, and an indication of the particular time period.

2. The method of claim 1, further comprising:
   transmitting, on the broadcast/multicast downlink channel during the particular time period, the particular software package, and a transport object identifier of the particular software package.

3. The method of claim 1, further comprising:
   determining that the transmission of the particular software package was not properly received by the wireless computing device; and
   transmitting an instruction to the wireless computing device to download the particular software package via a network mechanism other than the broadcast/multicast downlink channel.

4. The method of claim 1, wherein transmission of high-priority software packages are scheduled before transmission of low-priority software packages on the broadcast/multicast downlink channel.

5. The method of claim 1, wherein the threshold capacity level of the broadcast/multicast downlink channel is zero.

6. The method of claim 1, wherein the threshold capacity level of the broadcast/multicast downlink channel is non-zero, wherein one or more of the software packages are related to content of a particular media transmission, and wherein the one or more software packages are scheduled for transmission during the particular media transmission.

7. The method of claim 1, wherein the schedule is transmitted to the wireless computing device as part of a device management update.

8. The method of claim 1, wherein wireless computing devices use less power to receive software packages over the broadcast/multicast downlink channel than other types of wireless channels, and wherein the particular software package is scheduled to be transmitted on the broadcast/multicast downlink channel to reduce power consumption by the wireless computing device.

9. The method of claim 1, wherein the identifier of the broadcast/multicast downlink channel comprises an Internet Protocol (IP) address of a content server device, and transport session identifier for transmission of the particular software package.

10. An article of manufacture including a non-transitory computer-readable medium, having stored thereon program instructions that, upon execution by a computing device, cause the computing device to perform operations comprising:
    scheduling transmission of software packages on a broadcast/multicast downlink channel, wherein the schedule also includes media transmissions on the broadcast/multicast downlink channel, wherein the software package transmissions are scheduled for one or more of a plurality of time periods when the media transmissions are using less than or equal to a threshold capacity level of the broadcast/multicast downlink channel, and wherein the threshold capacity level is less than an entire capacity of the broadcast/multicast downlink channel;
    determining a particular software package related to a wireless computing device, wherein the particular software package is scheduled to begin transmission on the broadcast/multicast downlink channel during a particular time period of the plurality of time periods in which the particular software package can be completely transmitted without exceeding the capacity of the channel; and
    transmitting, to the wireless computing device, at least an identifier of the broadcast/multicast downlink channel, and an indication of the particular time period.

11. The article of manufacture of claim 10, wherein the operations further comprise:
    transmitting, on the broadcast/multicast downlink channel during the particular time period, the particular software package, and a transport object identifier of the particular software package.

12. The article of manufacture of claim 10, further comprising:
    determining that the transmission of the particular software package was not properly received by the wireless computing device; and
    transmitting an instruction to the wireless computing device to download the particular software package via a network mechanism other than the broadcast/multicast downlink channel.

13. The article of manufacture of claim 10, wherein transmission of high-priority software packages are scheduled before transmission of low-priority software packages on the broadcast/multicast downlink channel.

14. The article of manufacture of claim 10, wherein the threshold capacity level of the broadcast/multicast downlink channel is zero.

15. The article of manufacture of claim 10, wherein the threshold capacity level of the broadcast/multicast downlink channel is non-zero, wherein one or more of the software packages are related to content of a particular media transmission, and wherein the one or more software packages are scheduled for transmission during the particular media transmission.

16. A computing device comprising:
    at least one processor;
    memory; and
    program instructions, stored in the memory, that upon execution by the at least one processor cause the computing device to perform operations comprising:
    scheduling transmission of software packages on a broadcast/multicast downlink channel, wherein the schedule also includes media transmissions on the broadcast/multicast downlink channel, wherein the software package transmissions are scheduled for one or more of a plurality of time periods when the media transmissions are using less than or equal to a threshold capacity level of the broadcast/multicast downlink channel, and wherein the threshold capacity level is less than an entire capacity of the broadcast/multicast downlink channel;
    determining a particular software package related to a wireless computing device, wherein the particular software package is scheduled to begin transmission on the broadcast/multicast downlink channel during a particular time period of the plurality of time periods in which the particular software package can be completely transmitted without exceeding the capacity of the channel; and
    transmitting, to the wireless computing device, at least an identifier of the broadcast/multicast downlink channel, and an indication of the particular time period.

17. The computing device of claim 16, wherein the operations further comprise:
    transmitting, on the broadcast/multicast downlink channel the particular time period, the particular software package, and a transport object identifier of the particular software package.

18. The computing device of claim 16, further comprising:
    determining that the transmission of the particular software package was not properly received by the wireless computing device; and
    transmitting an instruction to the wireless computing device to download the particular software package via a network mechanism other than the broadcast/multicast downlink channel.

19. The computing device of claim 16, wherein transmission of high-priority software packages are scheduled before transmission of low-priority software packages on the broadcast/multicast downlink channel.

20. The computing device of claim 16, wherein the threshold capacity level of the broadcast/multicast downlink channel is non-zero, wherein one or more of the software packages are related to content of a particular media transmission, and wherein the one or more software packages are scheduled for transmission during the particular media transmission.

* * * * *